(12) United States Patent
Meyst et al.

(10) Patent No.: US 10,794,284 B2
(45) Date of Patent: Oct. 6, 2020

(54) SEAL PLATE WITH FLUID BYPASS CONTROL

(71) Applicant: UNITED TECHNOLOGIES CORPORATION, Farmington, CT (US)

(72) Inventors: William Meyst, Middletown, CT (US); Jonas S. Banhos, New York, NY (US); Andre Herman Troughton, Windsor Locks, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/501,582

(22) Filed: May 6, 2019

(65) Prior Publication Data

US 2019/0264611 A1 Aug. 29, 2019

Related U.S. Application Data

(63) Continuation of application No. 14/623,309, filed on Feb. 16, 2015, now Pat. No. 10,280,840.

(60) Provisional application No. 61/980,090, filed on Apr. 16, 2014.

(51) Int. Cl.
*F02C 7/06* (2006.01)
*F01D 25/18* (2006.01)
*F02C 7/28* (2006.01)

(52) U.S. Cl.
CPC ............... *F02C 7/06* (2013.01); *F01D 25/18* (2013.01); *F01D 25/183* (2013.01); *F02C 7/28* (2013.01); *F05D 2220/32* (2013.01); *F05D 2240/55* (2013.01); *F05D 2260/98* (2013.01)

(58) Field of Classification Search
USPC .......................................... 137/884
See application file for complete search history.

(56) References Cited

U.S. PATENT DOCUMENTS

| | | | | |
|---|---|---|---|---|
| 4,951,709 A ‡ | 8/1990 | Kirkham | ............... | F15B 13/081 137/26 |
| 5,610,341 A ‡ | 3/1997 | Tortora | ................... | F01D 17/02 73/756 |
| 5,803,124 A ‡ | 9/1998 | Newton | .................. | B60T 17/04 137/884 |
| 8,371,254 B2 ‡ | 2/2013 | Beyer | ..................... | F02F 1/243 123/41.31 |

(Continued)

FOREIGN PATENT DOCUMENTS

| EP | 0540192 A1 ‡ | 5/1993 | ............. B60K 25/00 |
|---|---|---|---|
| EP | 0540192 A1 | 5/1993 | |

OTHER PUBLICATIONS

European Communication and Search Report; Application No. 15163830.1-1607; dated Sep. 9, 2015; 6 pages.‡

*Primary Examiner* — Daphne M Barry
(74) *Attorney, Agent, or Firm* — Cantor Colburn LLP

(57) ABSTRACT

The present disclosure relates generally to a manifold including a plurality of manifold channels disposed therethrough, each manifold channel including a manifold channel opening, and a seal plate, including a plurality of seal plate apertures disposed thereon, operably coupled to the manifold, wherein the seal plate includes at least one seal plate channel extending between at least two of the plurality of seal plate apertures.

8 Claims, 5 Drawing Sheets

(56) References Cited

U.S. PATENT DOCUMENTS

| | | | |
|---|---|---|---|
| 8,616,003 B2 ‡ | 12/2013 | Hollon | F02M 61/163 |
| | | | 239/424.5 |
| 10,280,840 B2 * | 5/2019 | Meyst | F01D 25/18 |
| 2012/0031354 A1 ‡ | 2/2012 | Beyer | F02F 1/243 |
| | | | 123/41 |
| 2016/0356220 A1 | 12/2016 | Meyst et al. | |

* cited by examiner
‡ imported from a related application

SEAL PLATE WITH FLUID BYPASS CONTROL

CROSS-REFERENCES TO RELATED APPLICATIONS

The present application is a continuation of U.S. patent application Ser. No. 14/623,309, filed Feb. 16, 2015 and published Dec. 8, 2016 as US 2016/0356220 which claims the benefit of U.S. Provisional Patent Application No. 61/980,090, filed Apr. 16, 2014, all of which are hereby incorporated by reference in their entireties.

TECHNICAL FIELD OF THE DISCLOSED EMBODIMENTS

The present disclosure is generally related to gas turbine engines and, more specifically, to a seal plate with fluid bypass control.

BACKGROUND OF THE DISCLOSED EMBODIMENTS

Traditionally, manifolds for use with gas turbine engines are comprised of a single-piece part that comprises a cast component with cored flow passages. As fluids are pumped through the manifold, pressure builds therein which requires a bypass to relieve the pressure. Such bypasses may be integral to the manifold or external; thus, resulting in increased costs for the manifold assembly.

Improvements in manifold assemblies are therefore needed in the art.

SUMMARY OF THE DISCLOSED EMBODIMENTS

In one aspect, a manifold assembly is provided. The manifold assembly includes a manifold including a plurality of manifold channels disposed therethrough, each of the plurality of manifold channels including a manifold channel opening. The manifold assembly further includes a seal plate operably coupled to the manifold. The seal plate includes a, plurality of seal plate apertures disposed thereon. Each of the manifold channel openings are aligned with a respective one of the seal plate apertures.

The seal plate further includes at least one seal plate channel connecting at least two of the plurality of seal plate apertures to allow a fluid to pass therethrough. In at least one embodiment, the at least two seal plate apertures connected by the at least one seal plate channel are adjacent to one another.

In at least one embodiment, the at least one seal plate channel includes a bypass type channel. In at least one embodiment, the at least one seal plate channel includes a venturi type channel. In at least one embodiment, the at least one seal plate channel includes an orifice type channel. In at least one embodiment, a first one of the at least one seal plate channels extends between a first one of the plurality of seal plate apertures and a second one of the at least one seal plate channels.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
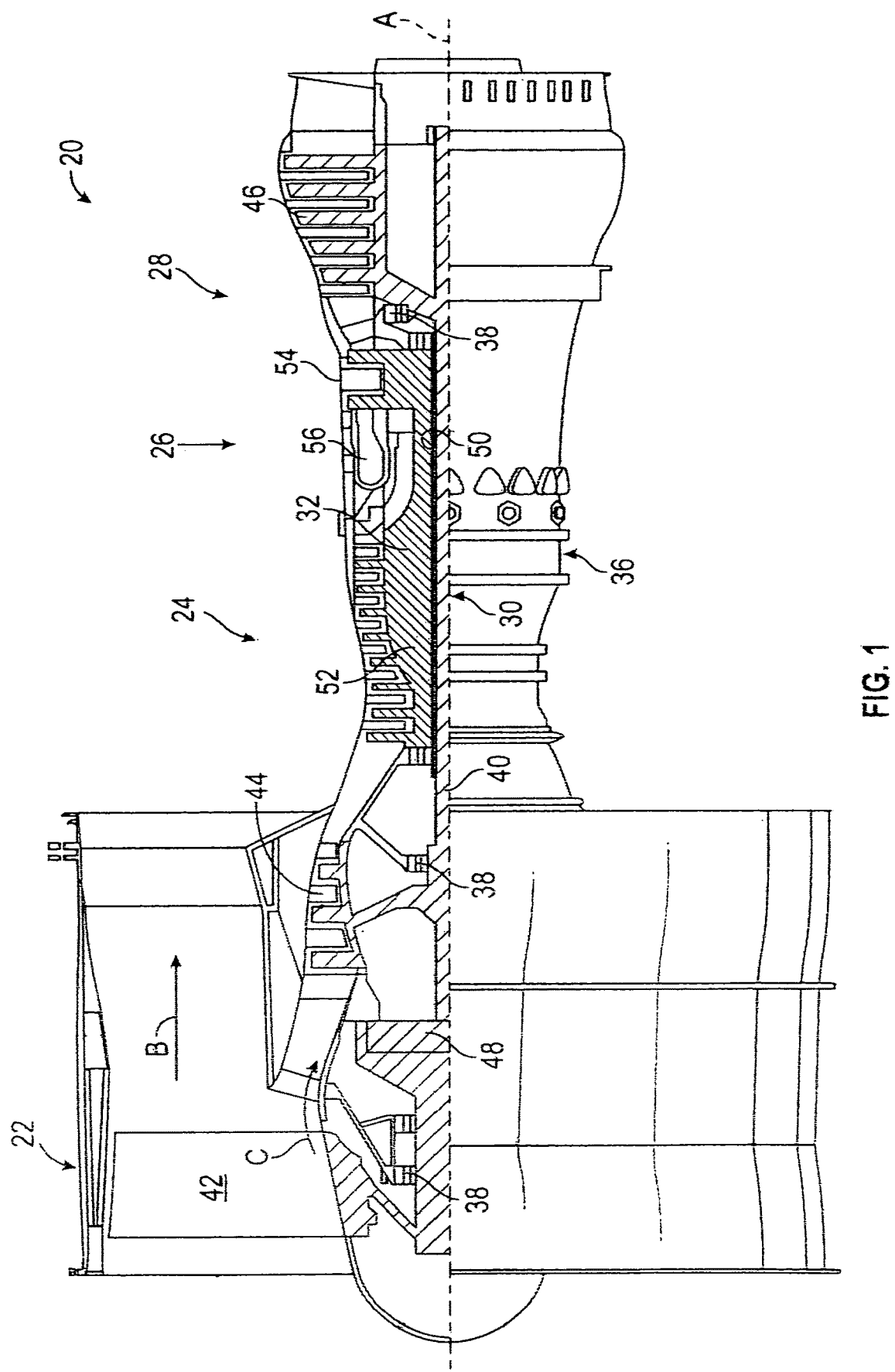
FIG. 1 is a schematic cross-sectional view of a gas turbine engine.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft., with the engine at its best fuel consumption—also known as "bucket cruise Thrust Specific Fuel Consumption ('TSFC')" —is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
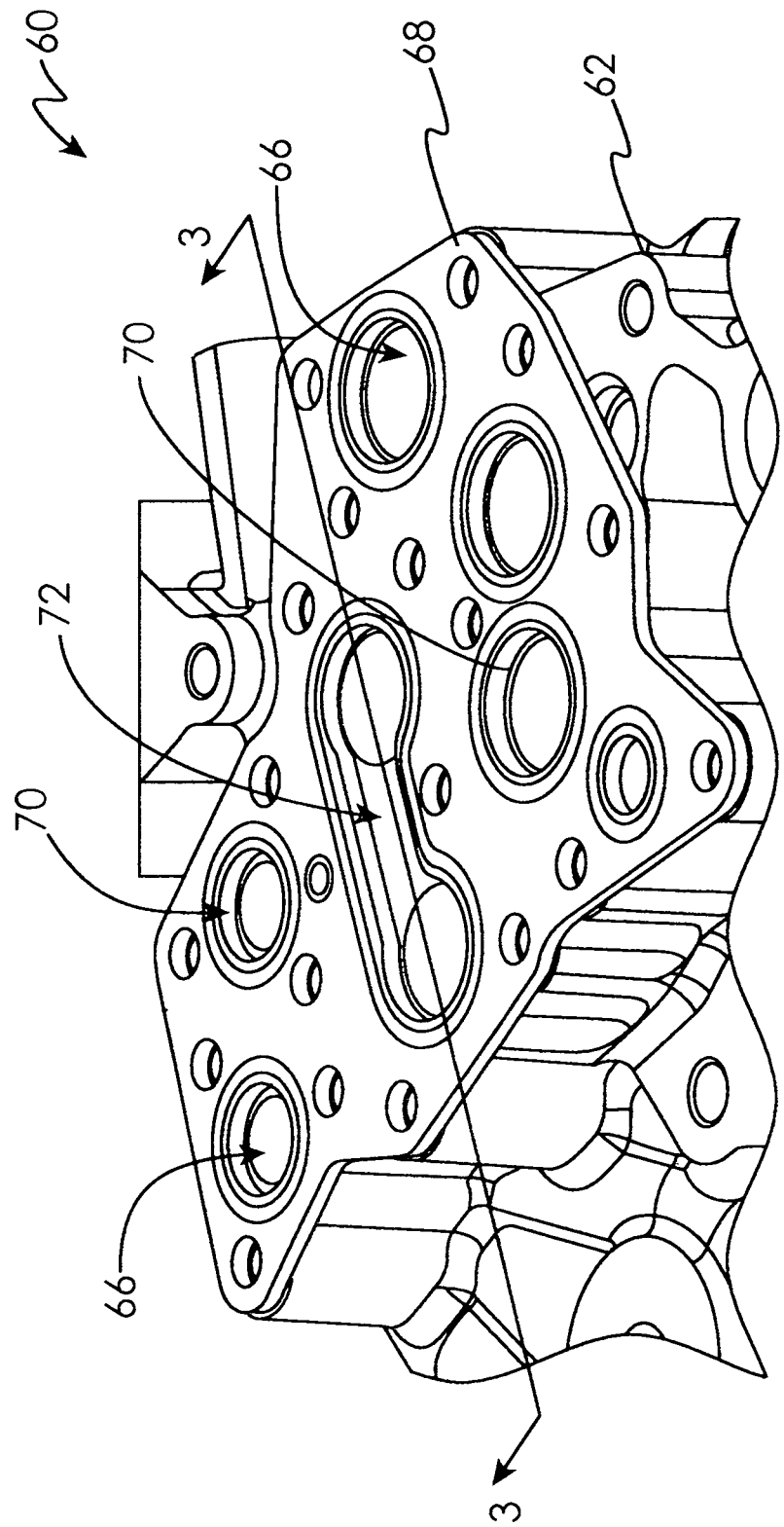
FIG. 2 is a perspective view of a manifold assembly in an embodiment.
Figure 3:
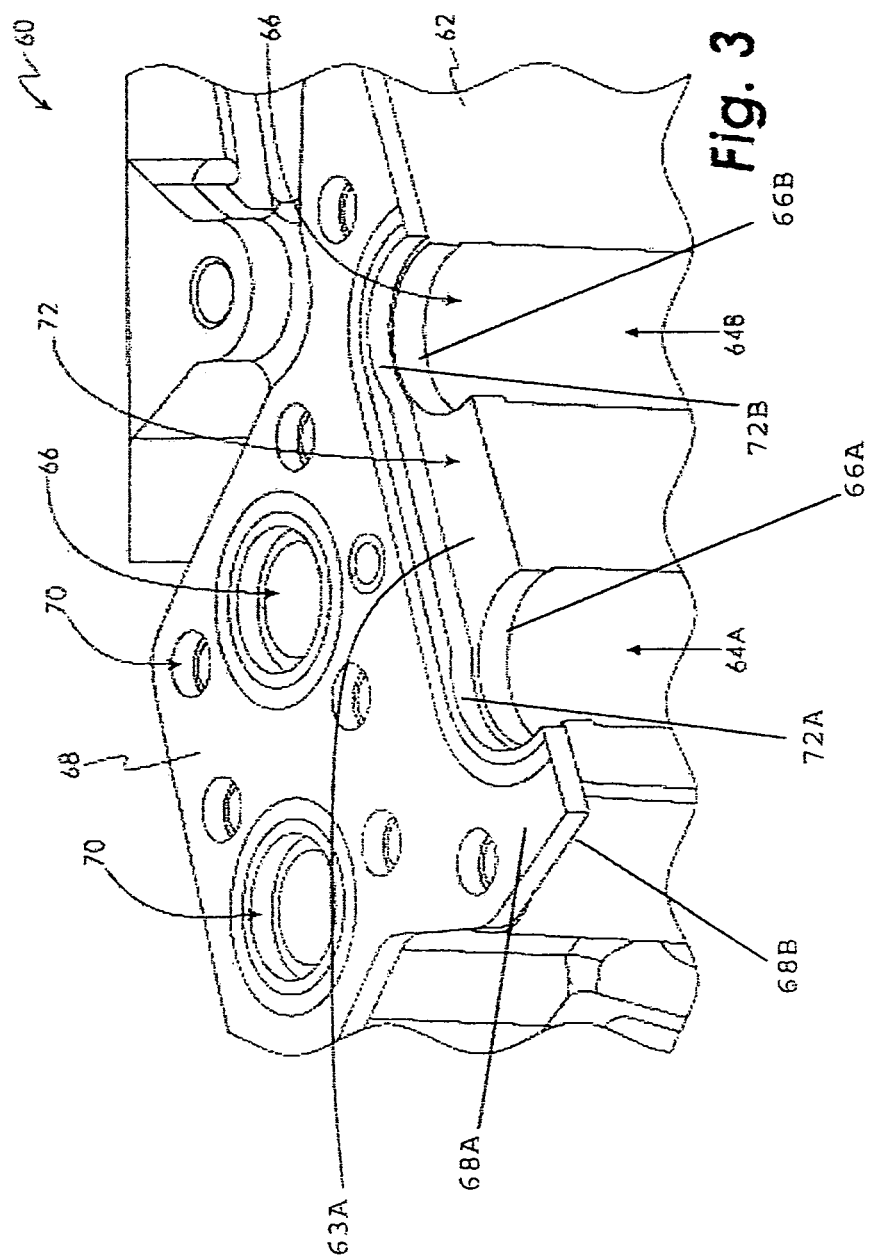
FIG. 3 is a cross-sectional view of a manifold assembly in an embodiment.

FIGS. 2 and 3 schematically illustrate a manifold assembly 60. The manifold assembly 60 includes a manifold 62 having a manifold first surface 63A (FIG. 3) which is a top surface of the manifold and a manifold second surface 63B (FIG. 5) which is a bottom surface of the manifold, and including a plurality of manifold channels 64 (channels 64A and 64B shown) disposed therethrough, each of the plurality of manifold channels 64 including a manifold channel opening 66. The manifold assembly 60 further includes a seal plate 68, with a seal plate top surface 68A and a seal plate bottom surface 68B, operably coupled to the manifold 62. It will be appreciated that the seal plate may be composed of any suitable material such as aluminum, steel, and titanium to name a few non-limiting examples. The seal plate 68 includes a plurality of seal plate apertures 70 disposed thereon. Each of the manifold channel openings 66 are aligned with a respective one of the seal plate apertures 70.

The seal plate 68 further includes at least one seal plate channel 72 connecting at least two of the plurality of seal plate apertures 70 to allow a fluid to pass therethrough. In at least one embodiment, the at least two seal plate apertures 70 connected by the at least one seal plate channel 72 are adjacent to one another. The at least one seal plate channel 72 is configured to regulate a fluid pressure of a fluid circuit later described herein.

Figure 4:
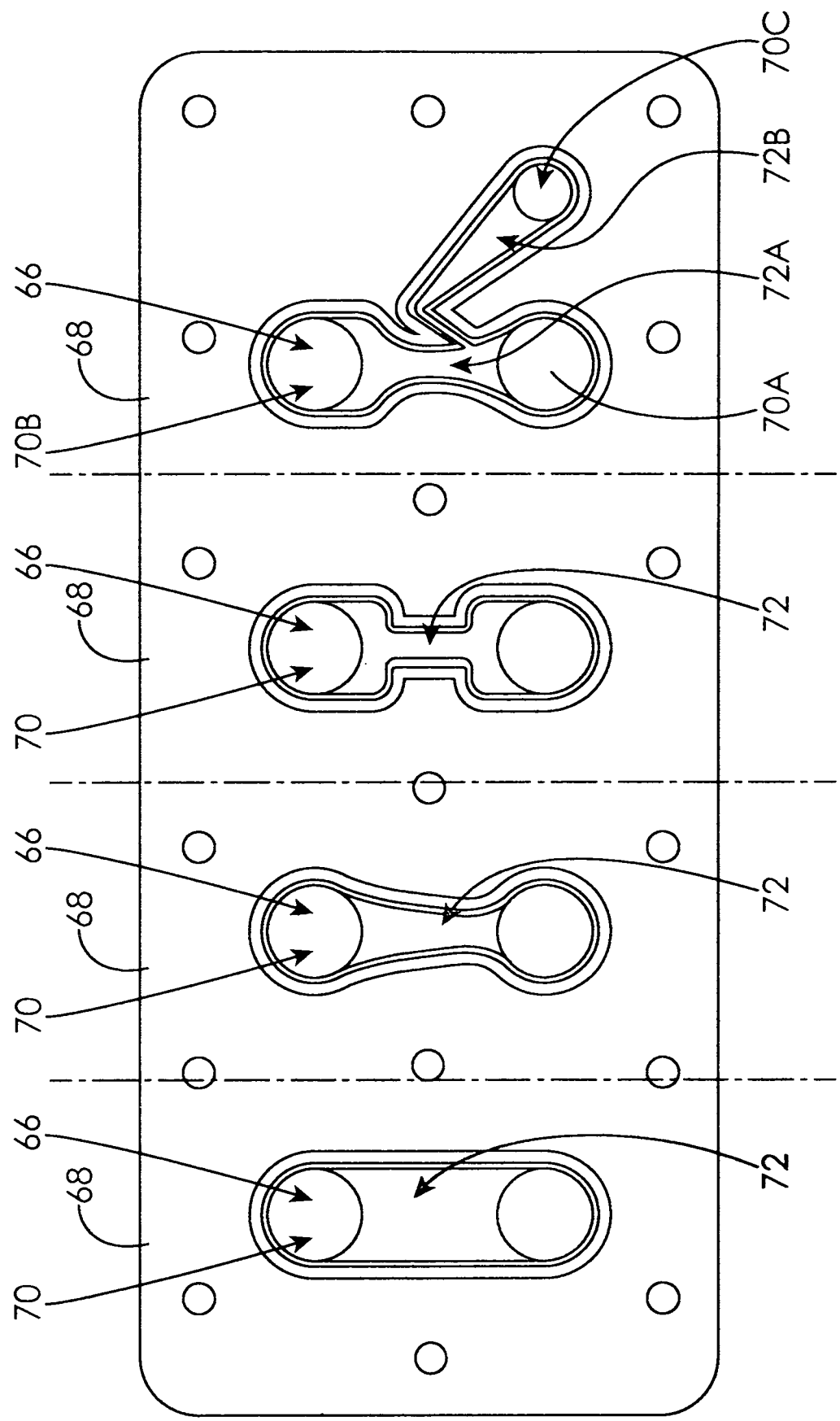
FIGS. 4A-D are front views of embodiments of seal plate channels.

In at least one embodiment, as shown in FIG. 4A, the at least one seal plate channel 72 includes a bypass type channel. In at least one embodiment, as shown in FIG. 48, the at least one seal plate channel 72 includes a venturi type channel. As defined herein, a venturi type channel is an opening which employs a temporary restriction or narrowing along at least a portion of its length. In at least one embodiment, as shown in FIG. 4C, the at least one seal plate channel 72 includes an orifice type channel. As defined herein, an orifice type channel is an opening which employs a temporary restriction in the middle and widens towards the ends. FIG. 4D shows an embodiment where a first seal plate channel 72A extends between seal plate apertures 70A and 708, positioned adjacent to one another, and a second seal plate channel 728 extending between seal plate aperture 70C and the first seal plate channel 72A. This arrangement may be used to reduce fluid pressure within a fluid circuit connected to seal plate apertures 70A and 708, as well as expel fluid from the manifold 62 through seal plate aperture 70C. Generally, the arrangements of FIGS. 4A-4D may be used to control, such as fine tune and/or reduce, pressure drop within the fluid circuit, to provide a bypass to the fluid circuit for example to control temperature within the fluid circuit, and/or, in the case of the venturi type channel 72, to control mass flow through the fluid circuit.

Figure 5:
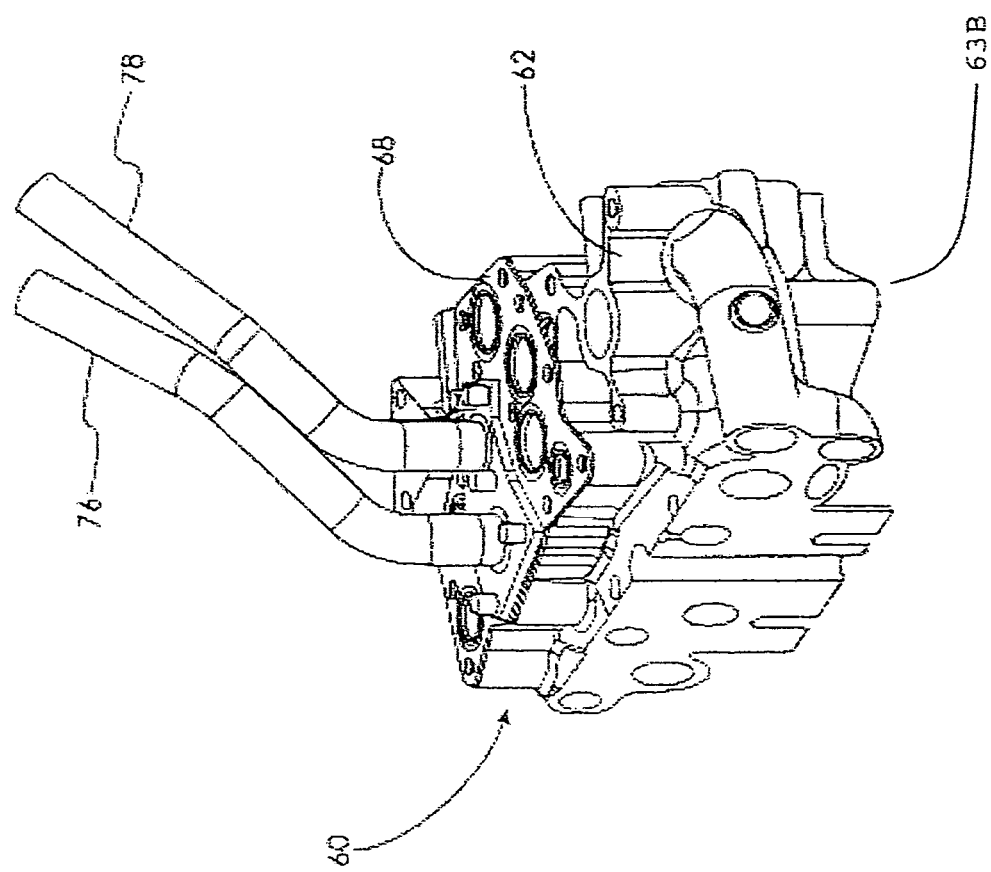
FIG. 5 is a perspective view of a pair of manifold assemblies operably coupled to one another to create a fluid circuit in an embodiment.

FIG. 5 schematically illustrates a seal plate 68 operably coupled to a first manifold assembly 60, and a second manifold assembly (not shown) operably coupled to the seal plate 68 via a pair of conduits 76 and 78. The conduits 76 and 78 create a fluid circuit to circulate a fluid between the first manifold assembly 60 and the second manifold assembly at a circuit flow rate. For example, oil to name one non-limiting example, is circulated between the manifold channel 64A (as shown in FIG. 3) of the first manifold assembly 60 through conduit 76 to a manifold channel (not shown) of the second manifold assembly. The fluid returns to the manifold channel 64B of first manifold assembly 60 via the conduit 78. Fluid is circulated in the aforementioned fluid circuit to aid in the lubrication of parts within the gas turbine engine 20. As the fluid circulates between the first manifold assembly 60 and the second manifold assembly, pressure builds within the fluid circuit. To relieve and/or regulate the fluid pressure within the fluid circuit, the at least one seal plate channel 72 creates a bypass between manifold channels 64A and 64B. It will be appreciated that the geometry of the at least one seal plate channel 72 and the cross-sectional area of the at least one seal plate channel 72 is selected based on a mass flow rate and a downstream pressure drop of the fluid circuit.

It will be appreciated that the seal plate 68 includes at least one seal plate channel 72 connecting at least two of the plurality of seal plate apertures 70 disposed thereon to create a bypass that regulates the pressure in a fluid circuit. It will also be appreciated that the at least one seal plate channel 72 reduces costs of the manifold assembly 60, and increases design flexibility of the manifold assembly 60 to meet flow requirements of the fluid circuit as additional parts or machine tooling would not be required to create a necessary bypass.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A manifold assembly comprising:
   a first manifold including a plurality of exterior surfaces including a manifold top surface;
   a first manifold channel and a second manifold channel, each extending between the manifold top surface and another of the plurality of exterior manifold surfaces;
   the first manifold channel and the second manifold channel having a respective first channel opening and second channel opening in the manifold top surface;
   a seal plate having a seal plate top surface and a seal plate bottom surface spaced from the seal plate top surface in a first direction, the first direction being an axial direction that defines a seal plate thickness;
   the seal plate bottom surface disposed against the manifold top surface;
   a first seal plate aperture and a second seal plate aperture extending through the seal plate in the axial direction;
   the first seal plate aperture and the second seal plate aperture respectively aligned with the first channel opening and the second channel opening;
   a seal plate channel extending in a second direction connecting the first seal plate aperture and the second seal plate aperture, wherein the second direction is perpendicular to the first direction;
   the seal plate channel defining a fluid circuit between the first manifold channel and the second manifold channel; and
   the seal plate channel narrowing in a third direction, whereby the seal plate channel is configured to control a flow characteristic of the fluid circuit, and wherein the third direction is perpendicular to the first direction and the second direction.

2. The seal plate of claim 1, wherein the flow characteristic configured to be controlled by the seal plate channel is one or more of flow pressure drop, flow temperature and mass flow rate.

3. The assembly of claim 1, comprising:
   a first conduit and a second conduit comprising respective first and second conduit ends; and
   the first and second conduit ends respectively connecting to the top surface of the seal plate and being aligned with the first seal plate aperture and the second seal plate aperture.

4. The assembly of claim 3, wherein:
   the first conduit and second conduit comprise respective third and fourth conduit ends that are configured for connecting to a second manifold.

5. A gas turbine engine comprising the assembly of claim 4.

6. The assembly of claim 1, wherein the seal plate channel comprises a venturi type channel.

7. The assembly of claim 1, wherein:
   the seal plate channel defines a restriction in the third direction;
   the restriction is located in the middle, in the second direction, of the seal plate channel; and
   the restriction widens in the third direction proximate the first seal plate aperture and the second seal plate aperture.

8. The assembly of claim 1, wherein the seal plate channel defines a geometric step-wise restriction in the third direction.

* * * * *